United States Patent [19]
Gallagher et al.

[11] 3,856,442
[45] Dec. 24, 1974

[54] DISPERSION OF MATERIALS IN THERMOPLASTICS

[75] Inventors: Brendan Gallagher, Welwyn; Anthony Graham Marshall Last, Welwyn Garden City, both of England

[73] Assignee: Imperial Chemical Industries, Limited, London, England

[22] Filed: Sept. 4, 1973

[21] Appl. No.: 394,397

Related U.S. Application Data

[62] Division of Ser. No. 189,135, Oct. 14, 1971, Pat. No. 3,787,542.

[30] Foreign Application Priority Data
Oct. 19, 1970 Great Britain.................. 49447/70

[52] U.S. Cl................... 425/4 C, 259/193, 264/51, 425/208, 425/817 C
[51] Int. Cl............................................. B29d 27/00
[58] Field of Search ....... 425/4, 4 C, 208, 376, 817, 425/817 C, DIG. 204; 264/51, 53, 328, 329; 259/5, 104, 9, 191, 193; 62/511; 138/40

[56] References Cited
UNITED STATES PATENTS
3,160,688 12/1964 Aykanian et al................ 425/4 C X
3,287,477 11/1966 Vesilind...................... 425/817 C X
3,368,008 2/1968 Azuma.................................. 264/51

Primary Examiner—R. Spencer Annear
Assistant Examiner—Mark Rosenbaum
Attorney, Agent, or Firm—Cushman, Darby & Cushman

[57] ABSTRACT

Apparatus for producing foamed thermoplastics products comprising a screw extruder provided with a metering pump and associated inlet for injecting controlled amounts of blowing agent into material and provided with a second inlet port connected to a supply of gas at constant pressure for injecting a gaseous blowing agent into the material within the extruder wherein the amount of gas injected is controlled by means of a flow restricting device such as a capillary tube located between the inlet port and the supply of gas.

12 Claims, 4 Drawing Figures

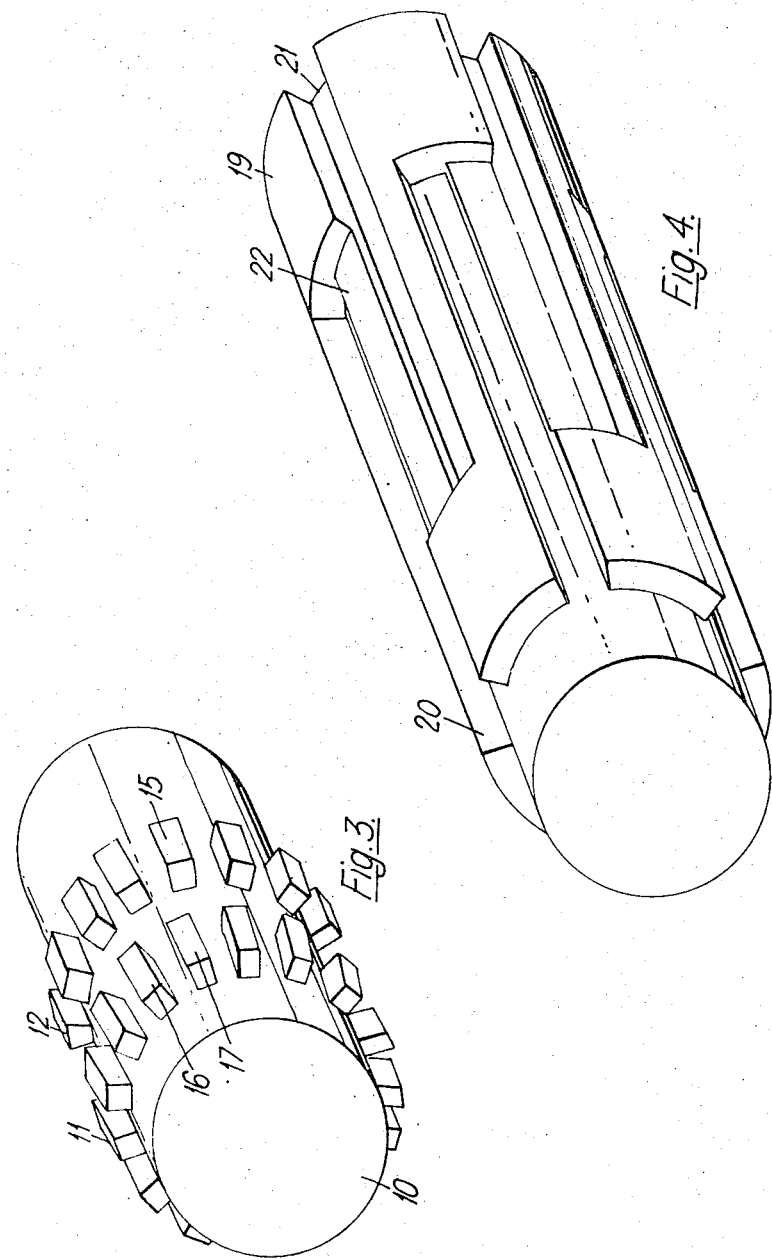

DISPERSION OF MATERIALS IN THERMOPLASTICS

This is a division, of application Ser. No. 189,135 filed Oct. 14, 1971, now U.S. Pat. No. 3,787,542.

The present invention relates to the manufacture of foamed articles from synthetic thermoplastic polymeric materials by extrusion and in particular to the manufacture of foamed sheets and films of such polymers.

In out United Kingdom Patent Specification 1 220 053 we describe the production of such foamed articles by extrusion of a synthetic thermoplastic polymeric material having a two component blowing agent system dissolved therein. One component of the blowing agent is miscible with the molten thermoplastic at the extrusion temperature while the other has a critical temperature below the extrusion temperature and so, under the conditions prevailing in the extruder, is present in the form of a gas dissolved in the mixture of the molten thermoplastic polymer and the first blowing agent.

We have found that, particularly when relatively large proportions of the first blowing agent are used, i.e. at least 20 percent by weight, based on the weight of the thermoplastic polymer, there is a tendency for the blowing agents to spurt from the die and for irregularities to be formed locally in the extrudate. In addition the extrudate may have undesirably coarse cells, and in severe cases, interruptions in the extrudate may occur. This is thought to be due to the tendency of both components of the blowing agent system, which are low viscosity fluids, to form large pockets in the extruder barrel which tend to tunnel through the mixture of the thermoplastic material and first blowing agent component to the extrusion die.

We have devised an apparatus for overcoming this problem.

Accordingly we provide apparatus for the production of a foamed synthetic thermoplastic polymeric material comprising extruding the thermoplastic in a molten state having dissolved therein a blowing agent system using a screw extruder from a zone of high internal pressure to a zone of lower pressure, wherein the blowing agent comprises from 20 to 75 percent by weight, based on the weight of the thermoplastic, of a first blowing agent which is completely miscible with the molten thermoplastic at said high pressure and which, at said high pressure has a boiling point above the temperature at which the thermoplastic is extruded and a boiling point at said lower pressure which is below the temperature at which the thermoplastic issues into the zone of lower pressure, and a second blowing agent in an amount up to 10 percent by weight of the thermoplastic, said second blowing agent having a solubility of at least 0.01 percent by weight in the mixture of the thermoplastic and the first blowing agent under the conditions of temperature and pressure at which the thermoplastic is extruded and a critical temperature below the temperature at which the thermoplastic is extruded, said second blowing agent being introduced into the molten thermoplastic in the extruder from a constant pressure supply through a flow restricting device across which there is a pressure drop of at least 100 psi, while the first blowing agent is metered in as a liquid.

It is of course necessary that both blowing agents be injected at pressures above the pressure inside the extruder and we have found that when the blowing agents are injected at these high pressures there is a tendency for large pockets of the blowing agents to be formed unless the second blowing agent is injected through a flow restricting device giving a pressure drop across the device of at least 100 psi and preferably 300–1000 psi and the first blowing agent is metered in as a liquid. It is of course important that the second blowing agent be well dispersed and dispersed as fine bubbles prior to solution to ensure the production of a uniform cell structure. We have found that the use of such a flow restricting device assists in obtaining this dispersion.

It is thought that the action of an extruder screw itself is not sufficient to achieve satisfactory mixing of the blowing agents with the molten thermoplastic while mixing systems in lieu of screws do not efficiently pump the material being extruded and there is a considerable pressure drop along the extruder barrel. This means that any low viscosity fluid which is injected under pressure into the more viscous material in the barrel of the extruder, will tend to tunnel through the material transmitting the full injection pressure along the length of the tunnel. Although the first blowing agent is a low viscosity fluid, it is nevertheless a liquid at the temperatures and pressures prevailing in the extruder. It can thus be metered in, i.e. a fixed quantity can be introduced in unit time, for example by a positive displacement pump such as a piston or diaphragm pump delivering a fixed quantity per storke. Hence, using such a device metering at a constant rate, it is not possible for the rate of delivery to increase and hence the tendency of large pockets of the first blowing agent being formed is avoided. However it is not conveniently possible for gases, which are supplied at constant pressure rather than at constant volume, to be metered into the extruder in this way. If however the second blowing agent is injected through a flow restricting device such as a constricted tube along which there is a substantial pressure drop, then any increase in the flow of the injected material causes an increased pressure drop across the flow restricting device reducing the actual pressure at the barrel which prevents the injected material tunnelling through the material in the extruder.

The flow restricting device conveniently may be an orifice, a valve or a porous plug but, in view of the constructional difficulties inherent in the production of such devices, we prefer to employ a length of a narrow bore tube, e.g. a capillary tube.

It is desirable to mix both the blowing agents thoroughly with the molten thermoplastic polymer. In a small extruder, in some cases, the normal extruder screw will give adequate mixing but when using larger extruders, particularly at outputs well below their designed output, the extruder screw will not be rotating sufficiently fast to give adequate mixing unless special mixing devices are also incorporated in the screw design.

One particularly preferred feature is to provide a section of the screw, after the polymer feed and melting region, wherein the polymer melt is divided into a plurality of separate streams and to inject the first blowing agent into the melt while it is so divided. Preferably both blowing agents are injected while the streams are divided, the second blowing agent being injected either upstream or, preferably, downstream of the first. The division of the melt into separate streams may conveniently be achieved by providing a special fluted section in the screw comprising a cylinder having several axial channels formed on its outer surface. We prefer that the cylinder has at least 3 channels formed therein and have found that a cylinder with 16 channels is particularly suitable. In this way if the cylinder is mounted to rotate with the extruder screw the polymer flow is divided into several streams. The first blowing agent can then be injected through a port in the barrel in the region where the cylinder is situated and so the molten thermoplastic polymer is subjected to a subdividing and hence mixing action at the point where the first blowing agent is injected so that the injected low viscosity fluid is immediately subjected to the first stage of subdivision that must precede dispersion on a molecular scale i.e. solution. Thus this immediate subdivision assists the avoidance of the formation of a large enough bubble that might tunnel through the melt. We also prefer that the cylinder is at least as long as the internal diameter of the extruder bore more preferably the length of the cylinder is from 3 to 6 times the extruder diameter as this enables the required relatively large quantities of the first blowing agent to be incorporated in a single injection step. thereby avoiding the necessity for the provision of several injection ports for the first blowing agent with the provision of appropriate screw sections and injection equipment.

In a preferred embodiment of the present invention further mixing sections are provided in the barrel of the extruder at a position beyond the points where the blowing agents are injected. Thus, where a fluted section into which at least the first blowing agent is injected is used, we prefer that the fluted section is followed by a turbine section which both shears and further subdivides the mixture and mixes the separate streams into which the polymer stream has been split during its passage through the fluted section. Preferably the fluted and turbine sections are designed so that there is only a slight pressure drop along the extruder barrel over the fluted section and the turbine section. We have found that, the smaller the pressure drop, the better the blowing agents will be dispersed within the thermoplastic polymeric material.

In a further preferred embodiment the turbine section is followed by a section in which the polymer/blowing agent solution is subjected to high shear in another mixing section. This section conveniently comprises a section wherein the polymer flow is divided into several different streams in each of which the polymer is subjected to high shear. For example a cylindrical member may be provided with inlet grooves which do not extend along the whole length of the cylindrical member. These grooves communicate with output grooves in the cylindrical member via bridging channels of lesser depth than the grooves so that the polymer/blowing agent solution is subjected to shear against the extruder barrel wall as it passes through said bridging channels. Alternatively the grooves may be of constant depth with idler rollers lying in the grooves which are themselves rotated by rotation of the extruder screw relative to the barrel walls. In this way the polymer flowing in the grooves is subjected to high shear.

Any synthetic thermoplastic polymer may be foamed according to the process of our invention. Examples of thermoplastics that may be foamed include polymers and copolymers of ethylene (low or high density), propylene, butene-1, 4-methyl pentene-1, including copolymers of olefine and unsaturated acids in which at least 10 percent of the carboxylic acid groups are neutralised by metal ions as described in U.S. Pat. No. 1,011,981; polystyrene, styrene/maleic anhydride copolymers, polyvinyl chloride, polyesters, polyamides, polyoxymethylenes and polycarbonates. Because of their cheapness and ready availability we have found that polyolefines, and particularly polyethylene, may very conveniently be used. Blends of these polymers may also be foamed by our techniques.

The first and the second blowing agents are selected so that they are inert with respect to the synthetic thermoplastic polymer under the pressure and temperature conditions of the pressure vessel.

The first blowing agent is completely miscible with the synthetic thermoplastic polymer and may be a liquid or a gas at normal temperature and pressure. It must however have a boiling point, at the pressure prevailing in the region into which the mixture is extruded (which will normally be atmospheric), below the temperature at which the mixture is extruded, so that foaming will occur at that temperature. The first blowing agent must as stated above be a good solvent for the thermoplastic under the conditions of pressure and temperature prevailing in the extruder at least immediately prior to the point from which the mixture is extruded into the zone of lower pressure and in practice this means that the first blowing agent should have a boiling point, at the pressure prevailing in the zone of high pressure, above the temperature at which the thermoplastic is extruded. In view of this and other limitations we have found that the most suitable substances for use as the first blowing agent are liquids whose boiling points at atmospheric pressure are greater than room temperature, i.e. 20°C and are at least 10°C below the temperature at which the homogeneous mixture is extruded.

Examples of liquids which may be used as the first blowing agent in our invention include saturated hydrocarbons such as pentane, hexane, heptane, octane; unsaturated hydrocarbons such as pentene, 4-methyl pentene, hexene, petroleum ether fractions; ethers such as diethyl ether, ketones such as acetone or methyl ethyl ketone; and halogenated hydrocarbons such as carbon tetrachloride, chloroform, ethylene dichloride, methylene chloride, or 1,1,2-trichloro-1,2,2-trifluoroethane. The particular liquid chosen for a given synthetic thermoplastic polymer is of course limited by its miscibility with the thermoplastic under the conditions of the pressure vessel.

In the case of polyethylene we have found that a very suitable first blowing agent is pentane, but that other useful first blowing agents are 1,1,2-trichloro-1,2,2-trifluoroethane, hexane, petroleum ether (B.P. 40° to 60°C or 60° to 80°C) and methylene chloride.

The concentration of the first blowing agent should be from 20 to 75 percent by weight of the polymer. Preferably less than 50 percent by weight, based on the weight of the polymer, of the first blowing agent is used. If a concentration of less than 20 percent is used, then it is not possible to produce foamed articles of low density and, if a concentration of more than 50 percent is used, the product is expensive to produce both because of the increasing expense of any solvent recovery step and because a larger fluid volume entails a larger extruder for the same weight output of foam and moreover there is a tendency for the cell walls in the foamed product to collapse so that an unsatisfactory product is obtained. The amount of first blowing agent used is in an excess of that required for the foaming. In this way the blowing agent absorbs latent heat of vaporisation from the thermoplastic polymer as it emerges from the extruder and thus cools the foaming thermoplastic and sets it in its foamed state.

If smaller quantities of the first blowing agent are used, all the blowing agent will vaporise before the composition has solidified. This will permit the foam structure to disappear, for example, by partial collapse or be modified since there will be insufficient cooling of the foamed composition by the vaporising blowing agent to cause it to solidify while there is still sufficient gas pressure generated by the blowing agent system to maintain the foam structure.

The second component of the blowing agent system acts as a nucleating agent for the cells formed by the vaporisation of the first component. The second blowing agent should have a critical temperature below the temperature within the extruder and so is gaseous when it is injected into the polymer stream but should dissolve in the molten polymer to give a single phase liquid within the barrel of the extruder. The second blowing agent is therefore normally a gas at room temperature although certain low boiling liquids may be used, especially in the case of a high melting polymer. It is essential that the second blowing agent should have a solubility in the mixture of the thermoplastic and the first blowing agent, under the conditions of pressure and temperature at which the thermoplastic is extruded, of at least 0.01 percent by weight since otherwise there will not be sufficient of the second blowing agent in the homogeneous mixture to nucleate a large number of very small bubbles on emergence from the pressure vessel; nucleation may arise instead from the first blowing agent with the result that a small number of very large bubbles are produced and the product is of little commercial use. The particular second blowing agent used will of course depend upon the nature of the thermoplastic but we have found that carbon dioxide, nitrogen, air (for polymers not subject to oxidation) methane, ethane, propane, ethylene, propylene, hydrogen, helium, argon and halogenated derivatives of methane and ethane, e.g. tetrafluorochloroethane, are examples of substances which may be used. In the case of polyethylene we find that carbon dioxide or nitrogen are particularly suitable, preferably in concentrations of at least 0.05 percent by weight of the thermoplastic polymer.

We prefer to add as much of the second gaseous blowing agent as possible but not more than will exceed its solubility in the melt which is usually fairly low, i.e. less than 10 percent by weight of the thermoplastic polymer.

The solubility of the second, gaseous, blowing agent depends of course on the nature of the second blowing agent, the nature of the polymers, the temperature and pressure in the pressure vessel, and to some extent on the amount and nature of the first blowing agent.

In considering the solubilities of inert gases, e.g. nitrogen, in polyolefines and hydrocarbon first blowing agents, the following considerations apply. For non-hydrocarbon first blowing agents and polymers other than polyolefines, they also act as a guide.

Above the melting point of the polyolefine, the first blowing agent and the polyolefine will be infinitely miscible. A given weight of first blowing agent/polyolefine mixture will have somewhat greater solubility for the second blowing agent than that of the same weight of the polyolefine alone, because the entropy of mixing will be increased by the presence of the low molecular weight material. (Other minor changes will occur due to the changed ratio of $CH_3$ to $-CH_2-$ groups).

In the range of interest, solubility increases with pressure, but slightly less than proportionately, and that, contrary to what has been found for solvent/polymer mixtures, Lundberg, Wilk and Huyett, J. Applied Physics Vol. 31 (1960) page 1137 have shown that solubility increases with temperature. This is contrary to the usual experience of permanent gases dissolving in condensed phases.

Generally pressure limitations dictate how much of the second gaseous blowing agent may be incorporated and normally the amount of second blowing agent will be within the range 0.1 to 1.5 percent, preferably 0.2 to 1.0 percent, by weight of the thermoplastic polymer.

Since the foam nucleating agent in our process is a soluble gas and not, as in some systems previously used, a solid particle, the foam may be produced free from non-thermoplastic contaminants and thus is very suitable for electrical applications where a high dielectric strength and low power factor are required. The system of the present invention is also cheap when readily available blowing agents are used.

The mixture of the thermoplastic and the blowing agent system may be extruded through any suitable die to produce the end product of the required shape, e.g. tube, sheet, filament or angled section, or with a crosshead die which could be used for wire covering. Since it is found that the best foaming is produced when the distance over which the pressure drop from the interior of the vessel to the atmosphere is as short as possible we prefer to use a die having a short land.

The techniques of the present invention may be used to produce foamed extrudates of any required shape or size. For example, the techniques may be used to coat wire or to produce foamed sheets or films. We have found that the techniques are particularly useful for the production of foamed films in which the polymer/blowing agent mixture is extruded as a thin sheet which is then stretched to produce film. The thin sheet which is extruded may be flat or tubular and if tubular may conveniently be stretched by the well known blow extrusion techniques. Foamed films produced in this way, particularly from polyolefines, are especially useful as wall covering materials.

Other uses of the foamed thermoplastics produced by our invention include as a very light packaging material, in the production of padding foams, e.g. in upholstery for seats or mattresses, as heat or sound insulants, electrical insulants, e.g. in wire covering and as capacitor or wave guide dielectrics, in the production of nonwoven materials, e.g. leather or, after needling punching, felt, after compression of the sheet form, e.g. between rollers under a pressure of from 100–10,000 p.s.i. as a writing material, and as decorative tapes, ribbons and filaments which may be made into woven articles.

The present invention is illustrated but in no way limited by reference to the accompanying drawings in which:

FIG. 3 is an isometric sketch of the mixing section of the screw immediately following the fluted section, showing the arrangement of teeth in just the first two rows of teeth of the mixing section.

FIG. 4 is an isometric sketch of the shearing section of the screw immediately following the toothed mixing section.

Figure 1:
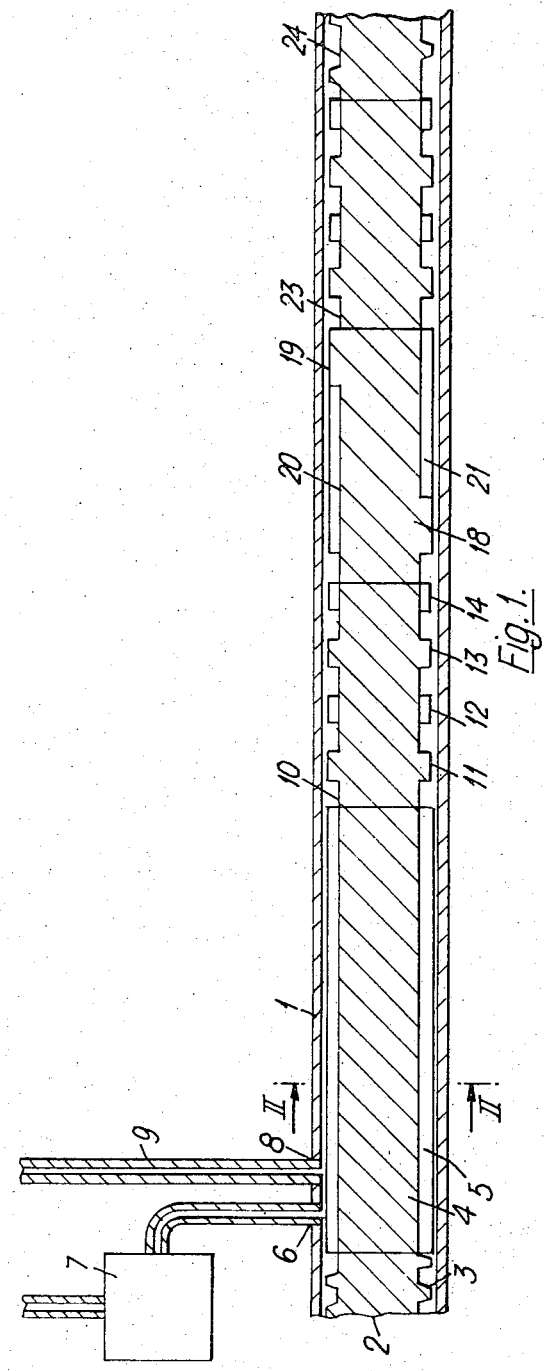
FIG. 1 is a longitudinal cross-section of part of the extruder showing the screw also in cross-section.
Figure 2:
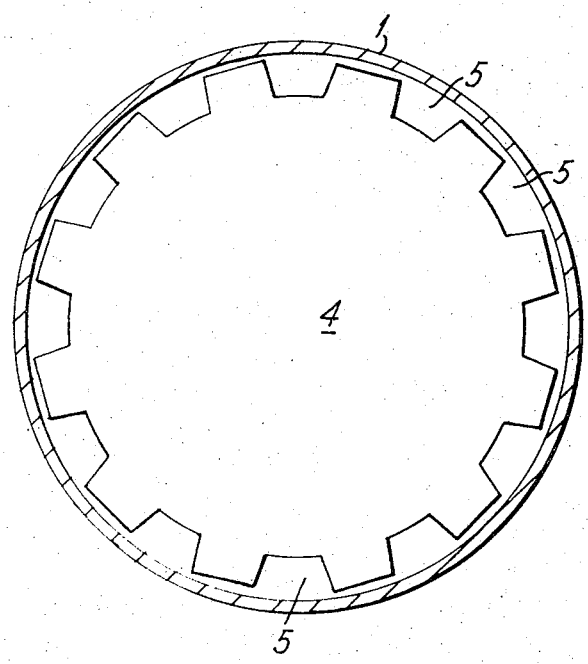
FIG. 2 is a cross-section of the fluted section of the screw taken along line II—II in FIG. 1.

The extruder has a barrel 1 in which a single screw 2 is rotatably mounted. The thermoplastic polymer is fed to the extruder via a feed hopper (not shown) and is compressed and melted in a conventional compression section of the screw. The barrel 1 is heated externally, by conventional heaters (not shown) along this compression section to effect melting of the thermoplastic. The end of the compression section is indicated in FIG. 1 by reference numeral 3. The thermoplastic polymer, now in a molten state is forced, by the compression section 3, to divide into a plurality of streams by the next section, 4, of the screw. This section is fluted, having a series of axial grooves 5 therein, and is rigidly mounted on the screw so that it rotates therewith. The fluted section is shown in cross-section in FIG. 2. The first blowing agent is fed to a port 6 in the extruder barrel 1 via a metering pump 7 from a reservoir (not shown). downstream of the injection port 6 is an injection port 8 through which the gaseous second blowing agent is injected via a capillary tube 9 from a constant pressure supply (not shown) with a pressure regulating valve (not shown) between the reservoir and the capillary tube. The capillary tube acts as a flow restricting device across which a pressure drop of at least 100 p.s.i. occurs when the gaseous second blowing agent is being injected.

In the fluted section 4, the thermoplastic and the first and second blowing agents are mixed to form a solution. This solution is then forced, by the polymer being forced into the fluted section 4 by the compression section 3 of the screw, into a turbine mixing section 10. This mixing section is in the form of a series of spaced toothed rotors 11, 12, 13, 14 mounted on the screw so that they rotate therewith. Alternate rows of teeth are staggered, as is shown in FIG. 3, wherein only the first two toothed rotors 11, 12 are shown. Thus tooth 15 of rotor 12 is axially in line with the space between teeth 16 and 17 of the first rotor 11. This turbine section 10 gives good mixing of the solution as the streams recombine after passing along the axial grooves 5 of the fluted section 4.

In order to improve the dispersion of the blowing agents further in the thermoplastic polymer, the solution is then sheared through a shearing section 18. This is also shown in FIG. 4 and consists of a cylinder 19 provided with, at the inlet end, with a number of axial grooves 20. These grooves are blind, i.e. they do not extend the whole length of the cylinder 18, but communicate with outlet grooves 21 via a bridging channels 22 which are of lesser depth than grooves 20 and 21. The solution is thus divided into a plurality of streams by grooves 20 and is subjected to high shear as it passes from groove 20 into groove 21 via channel 22 between the base of channel 22 and the barrel 1 of the extruder.

Following the shearing section 18 is a further turbine mixing section 23 of similar construction to turbine mixing section 10. This gives good mixing of the solution as the streams flowing from the output grooves 21 of the shearing section 18 recombine.

Downstream of the turbine mixing section 23 is a conventional screw section 24 to meter and extrude the solution through a die (not shown) wherefrom the solution emerges into a region of lower pressure and the blowing agents cause the thermoplastic to foam and solidify.

It will be appreciated that alternative devices can be used to obtain good mixing of the blowing agents in place of the fluted, turbine, and shearing sections and in some cases one or more of such sections can be omitted.

Our invention is illustrated by the following Example.

Example

A foamed polyethylene film was extruded from an extruder of the kind illustrated in the accompanying drawings having a barrel diameter of 4.75 inches and a screw length of 213.75 inches, the screw being rotated at a speed of 10 revolutions per minute.

the geometry of the screw sections, numbered in accordance with the drawings, was as follows:

Section 3 : a screw section of total length about 130 inches in which the flight depth decreases from 0.5 inches to 0.165 inches, Section 4 : a fluted section of length 19 inches comprising sixteen axial channels, 0.5 inches in depth and 0.44 inches in width, Section 10 : a distributive mixing section of length 9.5 inches comprising a number of rotors spaced apart axially, each rotor had 16 blades of depth 0.5 inches, Section 18 : a shearing section of length 9.5 inches with the bridging channels 21 having a depth of 0.015 inches, Section 23 : a mixing section of length 9.5 inches, identical to section 10, and Section 24 : a normal screw section of total length 38 inches having a transition section leading to a metering section of flight depth 0.18 inches.

Ports 6 and 8 were positioned 2.375 inches and 7.125 inches respectively from the start of the fluted section 4.

A mixture of 90 parts by weight of low density polyethylene and 10 parts by weight of titanium dioxide pigment was fed to the extruder at a rate of 100 pounds per hour. Pentane, at a rate of 33 per cent by weight of the feed stock, was injected into the extruder through port 6, and mixed into the molten polymer mixture. Nitrogen, at a rate of 0.5 per cent by weight of the total mixture, was injected into the melt through capillary tube 9 (0.007 inches internal diameter, 48 inches in length) giving rise to a pressure drop along the capillary of 300 p.s.i.

The barrel temperature was maintained at 140°C to 160°C in the region of screw section 2 and at 110°C along the remaining length of the barrel. A die at the outlet end of the extruder was maintained at a temperature of 105°C and from this die was extruded a foamed polyethylene film which was free from splitting and had a specific gravity of 0.15.

We claim:

1. Apparatus suitable for the production of extruded foamed synthetic thermoplastic polymeric materials comprising a screw extruder provided with two inlet ports, downstream of the melting zone, through which a liquid and a gaseous blowing agent respectively may be injected, the inlet port for the gaseous blowing agent being connected to a constant pressure supply of gaseous blowing agent via a flow restricting device while the inlet port for the liquid blowing agent is connected to a metering device for delivering a given quantity of liquid blowing agent per unit time.

2. Apparatus as claimed in claim 1 wherein the flow restricting device is a length of capillary tube.

3. Apparatus as claimed in claim 1 wherein the inlet port for the gaseous blowing agent is donwstream of the inlet port for the liquid blowing agent.

4. Apparatus as claimed in claim 1 wherein the extruder screw has a section, rotating with the screw and opposite at least the injection port for the liquid blowing agent, wherein the molten thermoplastic is divided into a plurality of streams.

5. Apparatus as claimed in claim 4 wherein the section of the extruder screw dividing the molten thermoplastic into streams comprises a cylinder rotating with the screw having a plurality of axial channels on its surface.

6. Apparatus as claimed in claim 5 wherein the cylinder has at least 3 axial channels.

7. Apparatus as claimed in claim 5 wherein the cylinder has a length at least equal to the internal diameter of the extruder barrel.

8. Apparatus as claimed in claim 7 wherein the length of the cylinder is from 3 to 6 times the internal diameter of the extruder barrel.

9. Apparatus as claimed in claim 4 wherein the injection port for the gaseous blowing agent is also located opposite the section of the screw where the thermoplastic is divided into streams.

10. Apparatus as claimed in claim 4 wherein there is provided a turbine mixing section in the screw after the section wherein the melt is divided into a plurality of streams.

11. Apparatus as claimed in claim 10 wherein the turbine mixing section comprises a plurality of toothed rotors mounted to rotate with the extruder screw, the teeth of alternate rotors being staggered.

12. Apparatus as claimed in claim 1 wherein, after the injection ports for the blowing agents, there is provided a section of the screw in the form of a cylinder having a plurality of blind inlet grooves therein communicating with a plurality of outlet grooves via channel sections of lesser depth than said grooves.

* * * * *